3,605,917
EARTH BORING MACHINE WITH DRIVE SHAFT SUPPORT BEARINGS

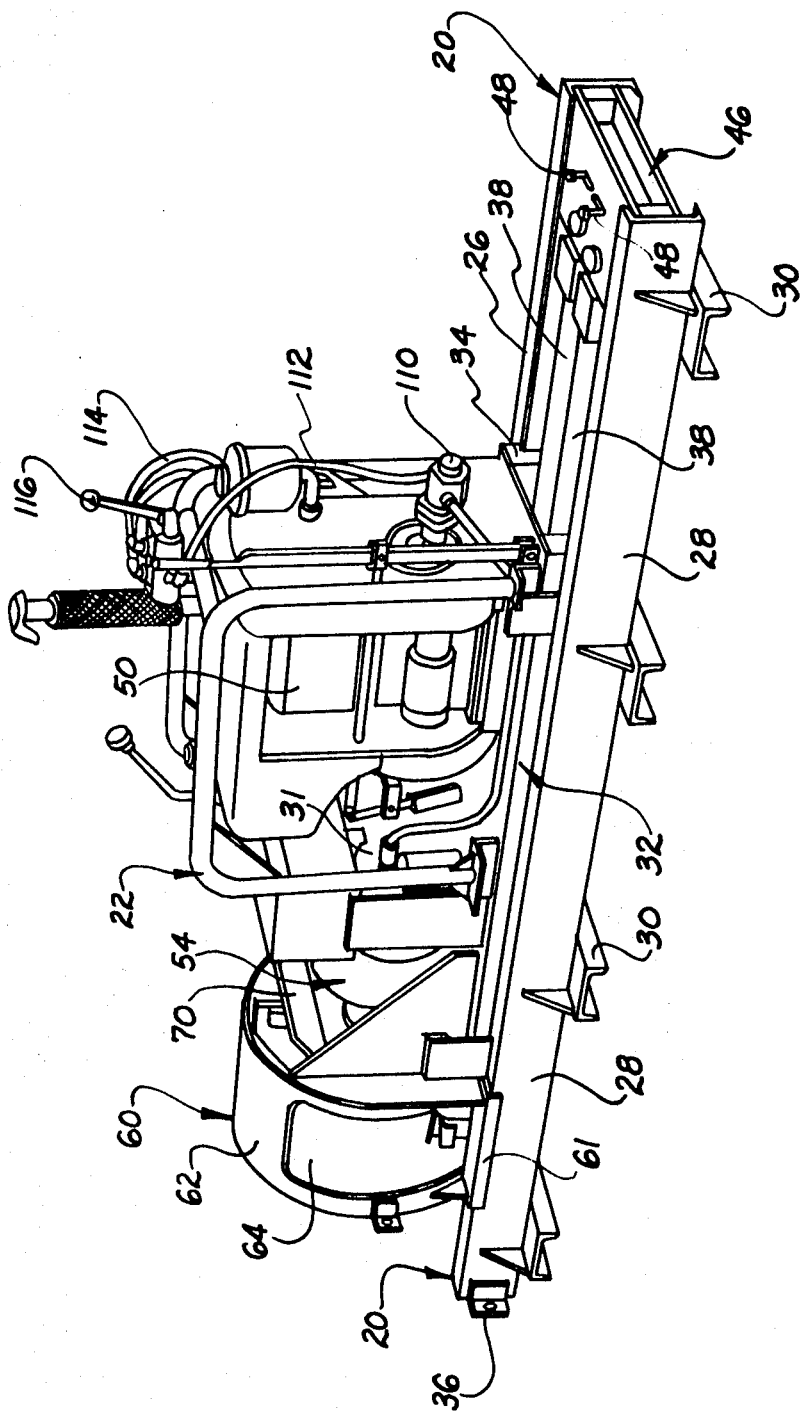

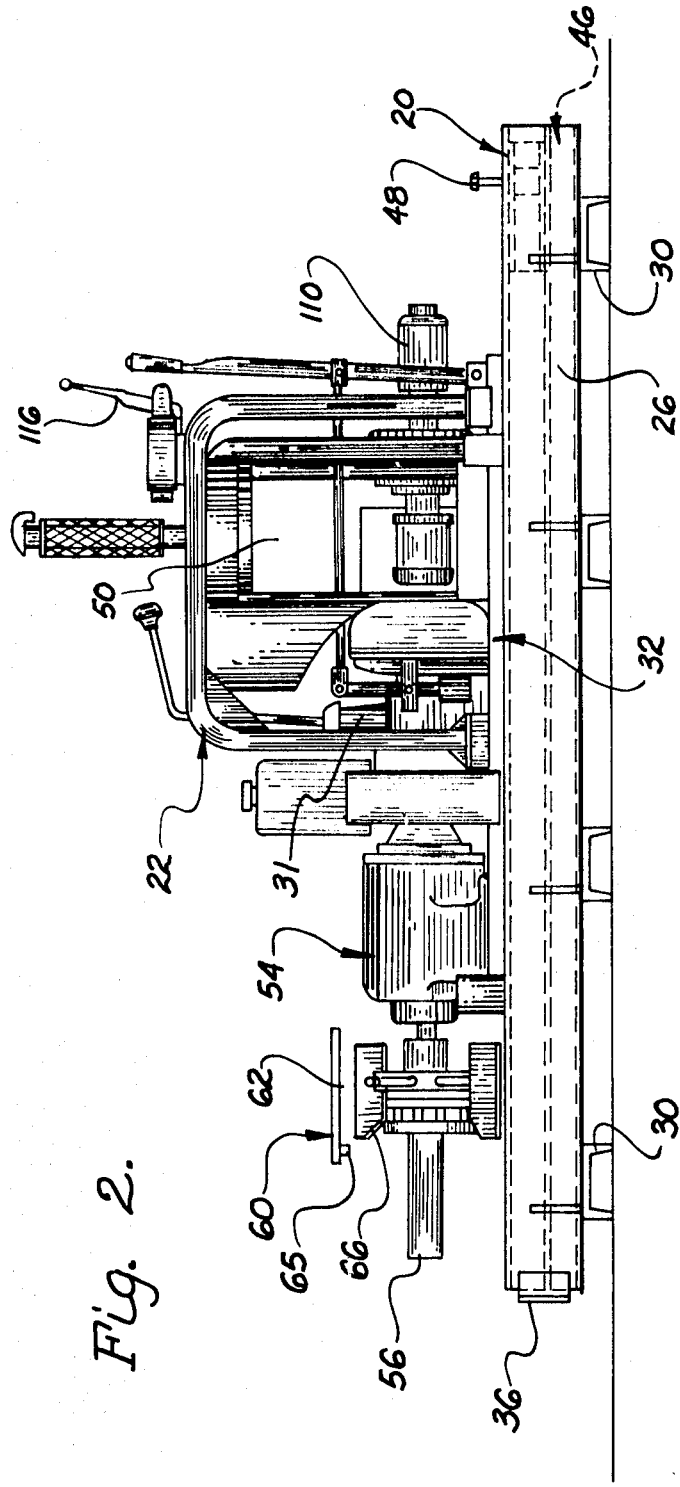

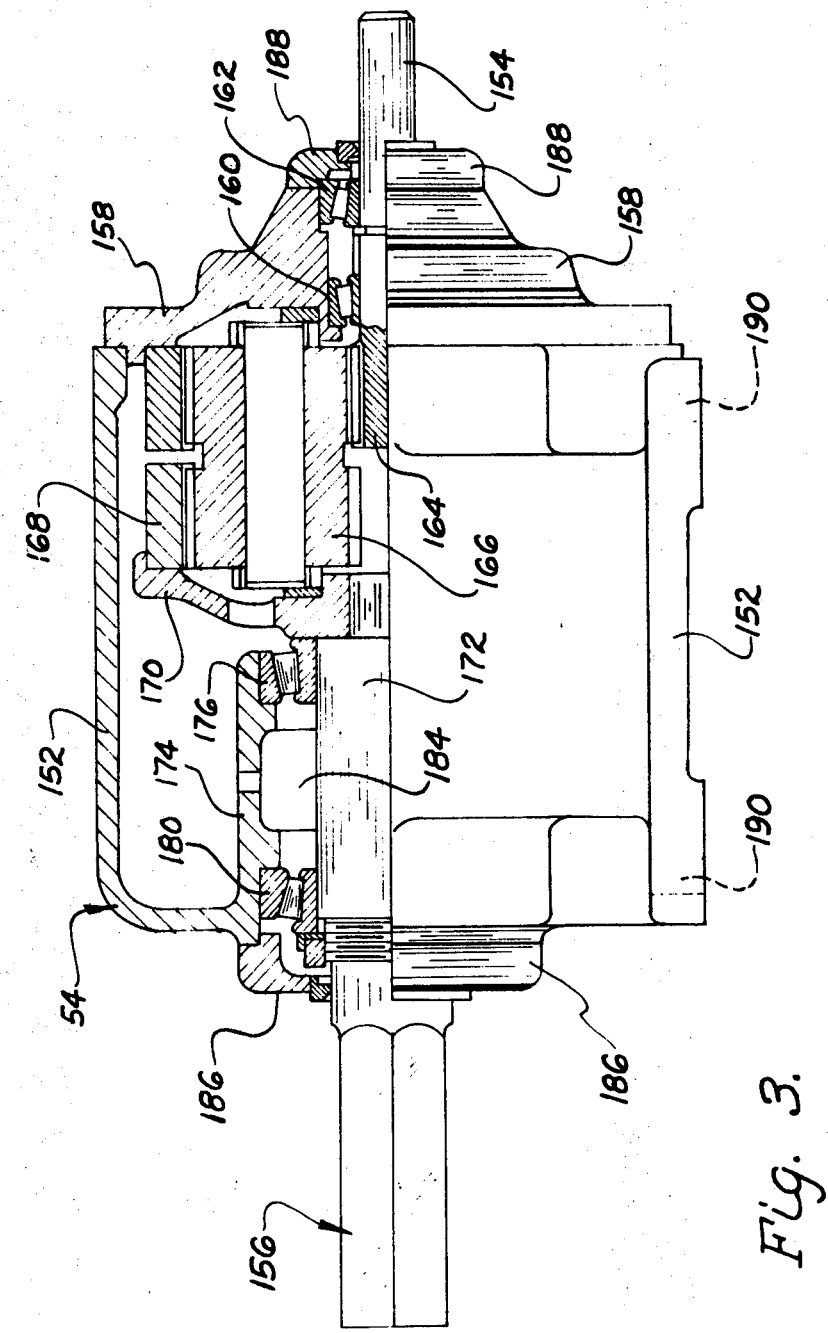

Albert R. Richmond, West Salem, Ohio, assignor to The Richmond Manufacturing Company, Ashland, Ohio
Filed Oct. 20, 1969, Ser. No. 867,817
Int. Cl. E21c 1/10
U.S. Cl. 173—154      6 Claims

ABSTRACT OF THE DISCLOSURE

A machine for the horizontal boring of shafts for the insertion of pipelines where excavation from the surface is undesirable, such as under freeways or the like, which comprises a boring mechanism for forming the holes as well as the push function for advancing the pipeline casings. This arrangement includes a novel power train arrangement for most effectively delivering the energy from the power means to the boring and pushing apparatus, said power train being characterized by a novel drive shaft and bearing arrangement that efficiently resists bending stresses in the transmission of torsional loads from said power means to said boring and pushing apparatus.

---

This invention relates to portable earth boring machines and more particularly to a machine adapted for horizontal boring of shafts for the insertion of pipelines where excavation from the surface is undesirable.

In general, the machine of the present invention includes a power means mounted on a carriage which is in turn mounted on longitudinally extending track members. The power means is adapted to rotate an earth boring auger and in addition, functions to drive a pump for supplying pressurized fluid to hydraulic cylinders mounted on said base means, said cylinders serving to provide a pushing apparatus for pushing pipe casing into the horizontal hole formed by said auger.

In accordance with the present invention, the power means is of a novel straight line arrangement and includes an internal combustion engine provided with an output shaft that is connected in straight line driving engagement with the input shaft of a transmission gear box. Such gear box in turn includes an output shaft connected in direct straight line driving engagement with the input shaft of a speed reducing means, the latter being provided with an output shaft that is in turn connected in direct straight line driving engagement with the input shaft of a speed reducing means, the latter being provided with an output shaft that is in turn connected in direct straight line driving engagement with an auger driving shaft and earth discharge means. The earth discharge means is rotatably disposed within a master casing pusher ring, utilized for driving the casing sections into the bored hole, mounted on the above mentioned track means for longitudinal movement therealong. Such pusher ring further includes earth discharge vanes for continuously discharging drillings through an opening in the side of the above mentioned master casing pusher ring.

As another aspect of the present invention the above mentioned speed reducing means is of a novel construction wherein an inwardly extending annular bearing mounting flange forms a rigidly positioned mount for an inner thrust bearing, positioned inwardly of the casing and adjacent to a driven gear on said output shaft. This construction co-operates with a second thrust bearing axially spaced from said first thrust bearing so as to efficiently resist bending stresses in the transmission of torsional loads from the driven gear on the output shaft to the above mentioned shaft means and earth discharge means.

As still another aspect of the present invention the power means serves the additional function of driving a hydraulic pump which supplies pressurized fluid for actuation of the above mentioned hydraulic cylinders used to advance the power means along the track during the drilling and pushing operation.

It is therefore an object of the present invention to provide an improved earth boring machine wherein all the components of the driving means, from the internal combustion engine to the shaft means that is connected to the boring augers, are disposed in direct straight line driving engagement with one another, hence providing a more rugged and efficient power transmitting apparatus.

It is another object of the present invention to provide a boring machine of the type described wherein the driving means comprises a unique speed reducing means which includes driven gear and thrust bearing arrangement adapted to efficiently resist high thrust loads encountered in the drilling and boring operation.

Further objects and advantages of the present invention will be apparent from the following description, reference being had to the accompanying drawings wherein a preferred form of embodiment of the invention is clearly shown.

In the drawings:

FIG. 1 is a rear left elevational view of a boring machine constructed in accordance with the present invention;

FIG. 2 is a left side elevational view of the boring machine of FIG. 1; and

FIG. 3 is a side elevational view, partially in section, of a gear reducing means comprising a portion of the apparatus of the preceding figure.

Referring in detail to the drawings, FIGS. 1 and 2 illustrate the complete boring machine of the present invention which includes a base means indicated generally at 20 and a power means indicated generally at 22. Referring particularly to base means 20, this assembly includes spaced longitudinally extending track members 26 and 28 which are mounted on transverse frame members 30.

A carriage indicated generally at 32 is provided with guides 34 disposed on the track members whereby power means assembly 22 can be moved longitudinally thereof in connection with the boring and casing pushing operations in a manner later to be described.

It should be mentioned that tracks 26 and 28 are provided with flanges 36, which permit the end to end attachment of plurality of such track sections. With continued reference to base means 20, carriage 32 is advanced and retracted with respect to tracks 26 and 28 by means of double acting power cylinders 38 each of which includes a forward pivotal connection with carriage 32. Power cylinders 38 each include an extendable rod pivotally connected to an advanceable cylinder base assembly indicated generally at 46 and described in detail in my co-pending application Ser. No. 867,814, filed Oct. 20, 1969.

In general, such advanceable cylinder mount assembly 46 includes manual actuators 48 which, when actuated, inwardly release dogs from slots in the track members 26 and 28 thereby freeing cylinder base mounting assembly 46 to be advanced and locked in a direction toward the left as viewed in FIGS. 1 and 2, thereby permitting power cylinders 38 to further advance carriage 32 from a new location in connection with the boring and casing pushing operations.

Referring next to power means 22, such assembly includes an internal combustion engine 50 which drives a transmission 52 the latter being drivingly connected to a gear reduction unit 54.

Reference is next made to FIG. 3 which illustrates in detail a gear reduction means which includes a casing 152, an input shaft 154, and an output shaft means indicated generally at 156, an endplate 158 is mounted on casing 152 and carries spaced bearing 160 and 162 which rotatably support input shaft 154, the latter including a gear 164 which drives planetary gear assembly 166, the latter being in driving engagement with an annular gear ring 168 mounted on the periphery of a plate 170. Plate 170 is mounted on an inner end 172 of output shaft means 156.

With continued reference to FIG. 3, casing means 152 includes an inwardly extending annular bearing mounting flange 174 that forms a mount for bearing means 176 located adjacent plate 170, for supporting the inner end 172 of output shaft means 156 together with plate 170 mounted thereon. Bearing mounting flange 174 further mounts an outer bearing means 180 that rotatably supports the central portion of output shaft means 156.

Annular bearing mountaing flange 174 further serves to axially space the bearing means 176 and 180 so as to efficiently resist side thrust loadings encountered during the boring and casing driving operation.

With continued reference to FIG. 3, it should be mentioned that annular casing portion 174 also forms a lubrication chamber 184 for the two spaced bearing means 176 and 180, and also is provided with a front annular shaft seal 186 and a rear shaft seal 188.

As seen in FIG. 3, casing means 152 further includes base mounting holes 190 for mounting speed reducing means 54 on carriage 32 in axial straight line driving engagement to the adjacent components of the driving means.

With continued reference to FIGS. 1 and 2, the machine further comprises a master casing pusher ring assembly indicated generally at 60 which includes an annular guard 62 provided with a discharge hole 64 for releasing the earth drillings rearwardly of the auger.

Vane members 66 mounted on driven shaft means 56 is rotated therewith and functions to discharge the drillings outwardly through hole 64.

It should now be mentioned that master casing pusher ring 60 is normally mounted on power means 22 by bolting same to the front of the power means at plate 70 and includes slides 71 mounted on track members 26 and 28.

In operation, the boring machine of the present invention is transported to the excavation site and, in a typical installation, such as where a pipeline is to be installed under a highway, an excavation trench is dug adjacent to one side of the highway embankment and base means 20 is lowered down onto the floor of the trench.

The workmen next assemble, at ground level, a plurality of auger sections, for example, a four foot length within a casing section which may be, for example, twelve feet long. The casing section, with the auger sections assembled therein, are next lowered by the lifting apparatus into the trench in a position forwardly of power means 22 and the first auger section is next coupled to power means 22 by connecting its shank into a suitable coupling on shaft means 56. Also, it should be mentioned that the casing section is positioned with its rear end inserted into annular guard 62 of master casing pusher ring 60 with the end of such casing section abutting the front end of an inner casing engaging flange 65 whereby axial thrust is applied directly to the end of the casing section.

The engine 50 of power means 22 is next energized to rotate the auger and auger spindle 56 and the auger and casing section are advanced into the drilling engagement with the embankment by double acting pushing cylinders 38 which are driven by pressurized fluid from a pump 120 connected to power cylinders 38 via conduits 122 and 124 and other ends of pushing cylinders 38 are connected to a reservoir on the power means which supplies fluid to pump 120. Cylinders 38 are energized for extended and retracted operation by a control valve means indicated generally at 126 to thereby either extend or retract carriage 32 with respect to base means 20.

With continued reference to operation of the boring machine, as the boring progresses the operator can advance the advanceable pushing cylinder mounting means assembly 46 along base means 20 and toward the hole by actuating levers 48 inwardly, with respect to the tracks, and moving the assembly 46 forwardly to a new location. Such forward adjustment of the pushing cylinder mounting means permits the boring and pushing apparatus to be advanced to a new location thereby permitting the operator to drill a hole deeper and advance the casing further into the embankment. After the previously described casing section is advanced completely into the embankment, power means 22 and carriage 32 on which it is mounted are retracted by means of double acting power cylinders 38 and the advanceable cylinder base mounting apparatus 46 is retracted to a position on the rear of the base means 20.

It should be mentioned that the first casing section, and the first group of auger sections positioned therein, are left in position in the embankment with the rearmost auger section being uncoupled from shaft means 56.

A second casing section with auger sections assembled therein is next lowered into the trench forwardly of the boring machine and the forward end of the casing is moved into abutting relationship with the first previously inserted casing section and jointed thereto by welding. The rear end of the second casing section, and the assembled auger sections therein, are coupled to the shaft means 56 and to master casing pusher ring 60 in the manner previously described, with the forward one of the newly inserted auger sections being coupled to the previously driven rear auger section.

The machine is next operated in the manner previously described with the cycles of operation being repeated as required.

I claim:

1. A portable earth boring machine comprising, in combination, base means including spaced track members; a carriage mounted for movement along said track members; an engine mounted on said carriage and including an output shaft; a transmission mounted on said carriage and including an input shaft in direct straight line driven engagement with said output shaft of said engine; a speed reducer means mounted on said carriage and including a speed reducer input shaft in driven straight line engagement with said transmission output shaft, said speed reducer means including a speed reducer output shaft, said speed reducer output shaft including a driven gear mounted thereon, a first bearing means for said speed reducer output shaft located adjacent to said driven gear and a second bearing means for said speed reducer output shaft mounted outwardly from said first bearing means; a casing pusher ring mounted on said carriage and including a shoulder for engaging the end of a casing section and a guard provided with an earth discharge opening; a rotary shaft means disposed in said casing pusher ring and including a rear end in driven straight line engagement with said speed reducer output shaft and a front end for direct straight line attachment to an auger section, said rotary shaft means further including earth ejecting veins for discharging drillings from said opening; cylinder base mounting means mounted on said track means and adapted to be selectively positioned at various longitudinal locations therealong; and power cylinder means including a base end mounted on said cylinder base mounting means and a second end mounted to said carriage whereby actuation of said power cylinder means advances and retracts said carriage along said track means.

2. The apparatus defined in claim 1 wherein said engine includes a second output shaft; a pump driven by said second output shaft; conduit means connecting said pump with said power cylinder means; and control valve means for said conduit means for forward and reverse operation of said power cylinder means.

3. A portable earth boring machine comprising, in combination, base means including spaced track members; a carriage mounted for movement along said track members; an engine mounted on said carriage and including engine output shaft; a transmission mounted on said carriage and including a transmission input shaft in direct straight line driven engagement with said output shaft of said engine and a transmission output shaft; a speed reducer means mounted on said carriage and including a speed reducer input shaft in driven straight line engagement with said transmission output shaft and a speed reducer output shaft, said speed reducer input shaft including a driving gear, a plurality of planetary gears driven by said driving gear, said speed reducer output shaft including a driven gear in driven engagement with said planetary gears, a first bearing means for said speed reducer output shaft located adjacent to the driven gear thereon, and a second bearing means for said speed reducer output shaft axially spaced from said first bearing means; casing pusher ring means mounted on said carriage for movement along said track means; and fluid motor means operative between said base means and said carriage for advancing and retracting said carriage with respect to said track means.

4. The apparatus defined in claim 3 wherein said engine includes a second output shaft; a pump driven by said second output shaft; conduit means connecting said pump with said power cylinder means; and control valve means for said conduit means for forward and reverse operation of said power cylinder means.

5. A portable earth boring machine comprising, in combination, base means including spaced track members; a carriage mounted for movement along said track members; an engine mounted on said carriage and including engine output shaft; a transmission mounted on said carriage and including a transmission input shaft in direct straight line driven engagement with said output shaft of said engine and a transmission output shaft; a speed reducer means mounted on said carriage and including a speed reducer input shaft in driven straight line engagement with said transmission output shaft and a speed reducer output shaft, said speed reducer input shaft including a driving gear, a plurality of planetary gears driven by said driving gear, said speed reducer output shaft including a driven gear in driven engagement with said planetary gears, a first bearing means for said speed reducer output shaft located adjacent to the driven gear thereon, and a second bearing means for said speed reducer output shaft axially spaced from said first bearing means; a casing pusher ring mounted on said carriage and including a shoulder for engaging the end of a casing section and a guard provided with an earth discharge opening; a rotary shaft means disposed in said casing pusher ring and including a rear end in driven straight line engagement with said speed reducer output shaft and a front end for direct straight line attachment to an auger section, said rotary shaft means further including earth ejecting veins for discharging drillings from said opening; cylinder base mounting means mounted on said track means and adapted to be selectively positioned at various longitudinal locations therealong; and power cylinder means including a base end mounted on said cylinder base mounting means and a second end mounted to said carriage whereby actuation of said power cylinder means advances and retracts said carriage along said track means.

6. The apparatus defined in claim 5 wherein said engine includes a second output shaft; a pump driven by said second output shaft; conduit means connecting said pump with said power cylinder means; and control valve means for said conduit means for forward and reverse operation of said power cylinder means.

References Cited

UNITED STATES PATENTS

| | | | |
|---|---|---|---|
| 2,394,194 | 2/1946 | McCarthy | 173—154 |
| 3,036,821 | 5/1962 | Letts | 299—55 |
| 3,232,360 | 2/1966 | Dickinson | 175—171X |
| 3,366,186 | 1/1968 | Young | 173—154X |

ERNEST R. PURSER, Primary Examiner

U.S. Cl. X.R.

175—122, 171